US009816493B2

(12) United States Patent
Van Allsburg et al.

(10) Patent No.: US 9,816,493 B2
(45) Date of Patent: Nov. 14, 2017

(54) FUEL INJECTION PUMP

(71) Applicant: Exergy Engineering LLC, Grand Rapids, MI (US)

(72) Inventors: Mike Van Allsburg, Dorr, MI (US); Philip J. DeVries, Caledonia, MI (US); Gregg R. Spoolstra, Hudsonville, MI (US); Randall C. Harkema, Caledonia, MI (US)

(73) Assignee: Exergy Engineering LLC, Grand Rapids, MI (US)

( * ) Notice: Subject to any disclaimer, the term of this patent is extended or adjusted under 35 U.S.C. 154(b) by 378 days.

(21) Appl. No.: 14/188,933

(22) Filed: Feb. 25, 2014

(65) Prior Publication Data
US 2014/0314588 A1    Oct. 23, 2014

Related U.S. Application Data

(60) Provisional application No. 61/803,964, filed on Mar. 21, 2013.

(51) Int. Cl.
*F04B 1/04*     (2006.01)
*F16K 15/02*    (2006.01)
*F04B 53/16*    (2006.01)

(52) U.S. Cl.
CPC .......... *F04B 1/0448* (2013.01); *F04B 1/0421* (2013.01); *F04B 53/16* (2013.01); *F16K 15/026* (2013.01)

(58) Field of Classification Search
CPC .... F04B 1/0426; F04B 1/0448; F04B 1/0443; F04B 1/0531; F02M 59/06; F02M 59/442;

(Continued)

(56) References Cited

U.S. PATENT DOCUMENTS 5,967,018 A *  10/1999  Breveglieri ........... F03C 1/0605
                                                    417/269
7,571,713 B2 *  8/2009  De Luca ............... F04B 1/0448
                                                    123/446

(Continued)

FOREIGN PATENT DOCUMENTS

DE        19814505 A1 *  1/1999

OTHER PUBLICATIONS

Guentert er al, DE 19814505, Machine Translation provided.*

(Continued)

*Primary Examiner* — Charles Freay
*Assistant Examiner* — Kenneth J Hansen
(74) *Attorney, Agent, or Firm* — Gardner, Linn, Burkhart & Flory, LLP

(57) ABSTRACT

A fuel pump comprises a cam assembly having a lobe, and a body assembly including a cavity for receiving the cam assembly. The body assembly includes both a body portion and a cover portion that cooperatively form the cavity. The body portion includes a lobe cavity, an engagement surface and an opening at the cavity, with the cover portion including a respective engagement surface and opening. The engagement surfaces are mated together with the cam assembly disposed in the cavity and extending through the openings, and is configured to rotate in the cavity with the lobe disposed in the lobe cavity. A groove is formed in one of the engagement surfaces of the body portion or cover portion for receiving a seal cap at least partially therein adjacent the lobe cavity.

18 Claims, 5 Drawing Sheets

(58) Field of Classification Search
CPC ............... F02M 59/485; F04C 15/0003; F04C 15/0007; F04C 15/0023; F04C 15/0026; F16K 15/026; F16K 15/063
USPC ................................. 92/72; 137/515.3, 515.7
See application file for complete search history.

(56) References Cited

U.S. PATENT DOCUMENTS

| | | | | |
|---|---|---|---|---|
| 2002/0104514 A1* | 8/2002 | Mori | ...................... | F02M 59/06 123/495 |
| 2002/0159903 A1* | 10/2002 | Utsumi | ............... | F04B 53/1025 417/569 |
| 2006/0093490 A1* | 5/2006 | Kleinbeck | ............ | F02M 59/102 417/273 |
| 2009/0120280 A1* | 5/2009 | Takamizawa | .......... | F02M 59/06 92/72 |

OTHER PUBLICATIONS

McGlothlin, Mike. "Inside the Bosch CP3 Injection Pump." [Online] Available http://www.dieselpowermag.com/tech/1204dp_inside_the_bosch_cp3_injection_pump/ dated Apr. 2012.

* cited by examiner

US 9,816,493 B2

FUEL INJECTION PUMP

CROSS REFERENCE TO RELATED APPLICATION

The present application claims priority of U.S. provisional application Ser. No. 61/803,964 filed Mar. 21, 2013, which is hereby incorporated herein by reference in its entirety.

BACKGROUND OF THE INVENTION

The present invention is directed to a fuel injection pump, and in particular to a pump for a common rail fuel system.

A common rail fuel pump operates to supply pressurized fuel to a fuel rail that is in turn connected with individual injectors, such as solenoid operated injectors, that deliver fuel to the individual cylinders of an engine. Common rail fuel injection pumps are known, such as the Bosch CP3 fuel injection pump. The fuel output of this pump is limited by the geometry of the pump body, and in particular maximum plunger lift is constrained by the diameter of the pump body bore.

SUMMARY OF THE INVENTION

The present invention provides a common rail fuel pump that provides increased fuel supply. In particular, the fuel pump of the present invention enables the stroke of the pump plungers to be increased to thereby provide a higher volume common rail fuel injection pump.

According to an aspect of the present invention a fuel pump comprises a cam assembly that includes a lobe, and a body assembly including a cavity for receiving the cam assembly. The body assembly includes both a body portion and a cover portion with the body portion and said cover portion cooperatively forming the cavity. The body portion includes a lobe cavity, an engagement surface and an opening at the cavity, with the cover portion including a respective engagement surface and opening. The engagement surfaces are mated together with the cam assembly disposed in the cavity and extending through the openings, and is configured to rotate in the cavity with the lobe disposed in the lobe cavity. A groove is formed in one of the engagement surfaces of the body portion or cover portion for receiving a seal cap at least partially therein adjacent the lobe cavity, where the seal cap is a separate component from the body and cover portions.

In a particular embodiment the groove is formed in the engagement surface of the cover portion and the body portion further includes a flange disposed about the opening of the body portion with the seal cap being disposed on the flange and the flange and seal cap being at least partially disposed in the groove. Still further, the seal cap may include an internal wall, an external wall, and a radially outwardly projecting shoulder extending from the external wall, with the shoulder being disposed on an end of the flange when the seal cap engages with the flange. The groove further includes an inner wall and an outer wall with the inner wall including a seal ring groove, and wherein a seal ring disposed within the seal ring groove contacts the seal cap.

According to another aspect of the present invention, a fuel pump comprises a cam assembly having a lobe and a body including a cavity for receiving the lobe with the cavity defining an opening in the body. The fuel pump further includes a cover having a channel defined in an engagement surface of the cover, with a seal cap being disposed within the channel when the cover and body are assembled together. In a particular embodiment the body includes a flange disposed about the opening in the body and the seal cap engages with the flange and both the flange and seal cap are disposed within the channel when the cover and body are assembled together.

According to still another aspect of the present invention, a fuel pump includes an inlet valve assembly and an inlet valve retainer, with the fuel pump including a body having a threaded bore. The inlet valve retainer includes external threads for engagement with the threaded bore for retaining the inlet valve assembly, and includes an internal cavity defining a receptacle. The inlet valve assembly includes a valve body with the valve body being received within the receptacle for axially aligning the inlet valve assembly relative to the threaded bore.

The fuel pump of the present invention enables a cam assembly having a greater stroke to be utilized for higher performance applications, with the opening of the body portion of the fuel pump being sized to enable a larger cam lobe to be installed. When so installed, the seal cap engages with the flange on the body portion and extends into the groove or channel on the cover portion, with the seal cap providing a sealing surface at its inner wall against which an o-ring can contact.

These and other objects, advantages, purposes and features of this invention will become apparent upon review of the following specification in conjunction with the drawings.

DESCRIPTION OF THE PREFERRED EMBODIMENTS

Figure 1:
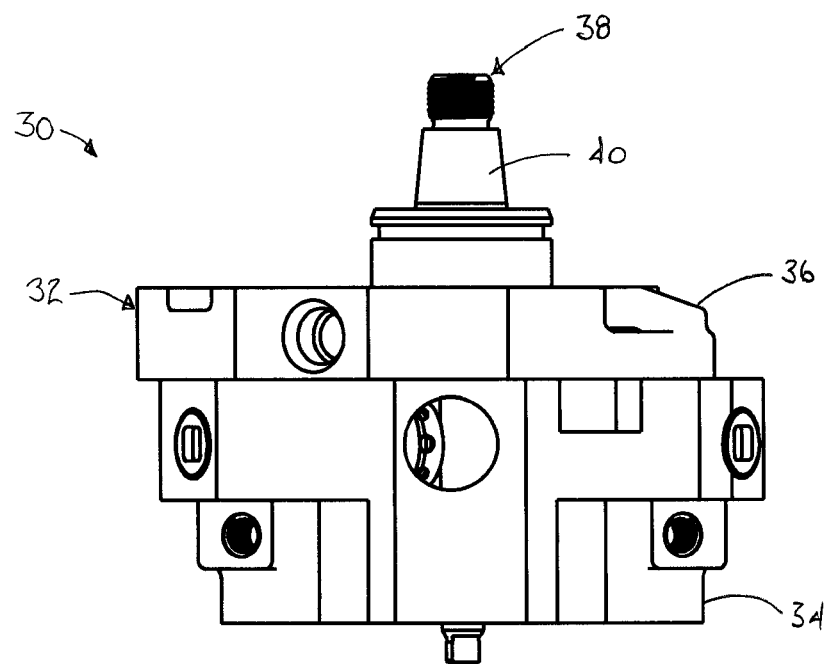
FIG. 1 is a side elevation view of a fuel pump assembly in accordance with the present invention.
Figure 2:
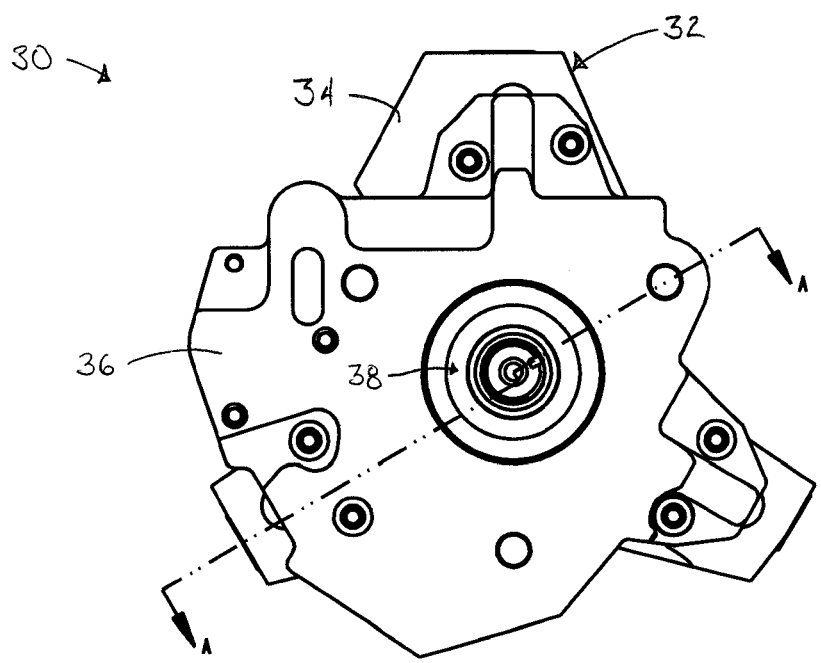
FIG. 2 is a top plan view of the fuel pump assembly of FIG. 1.
Figure 3:
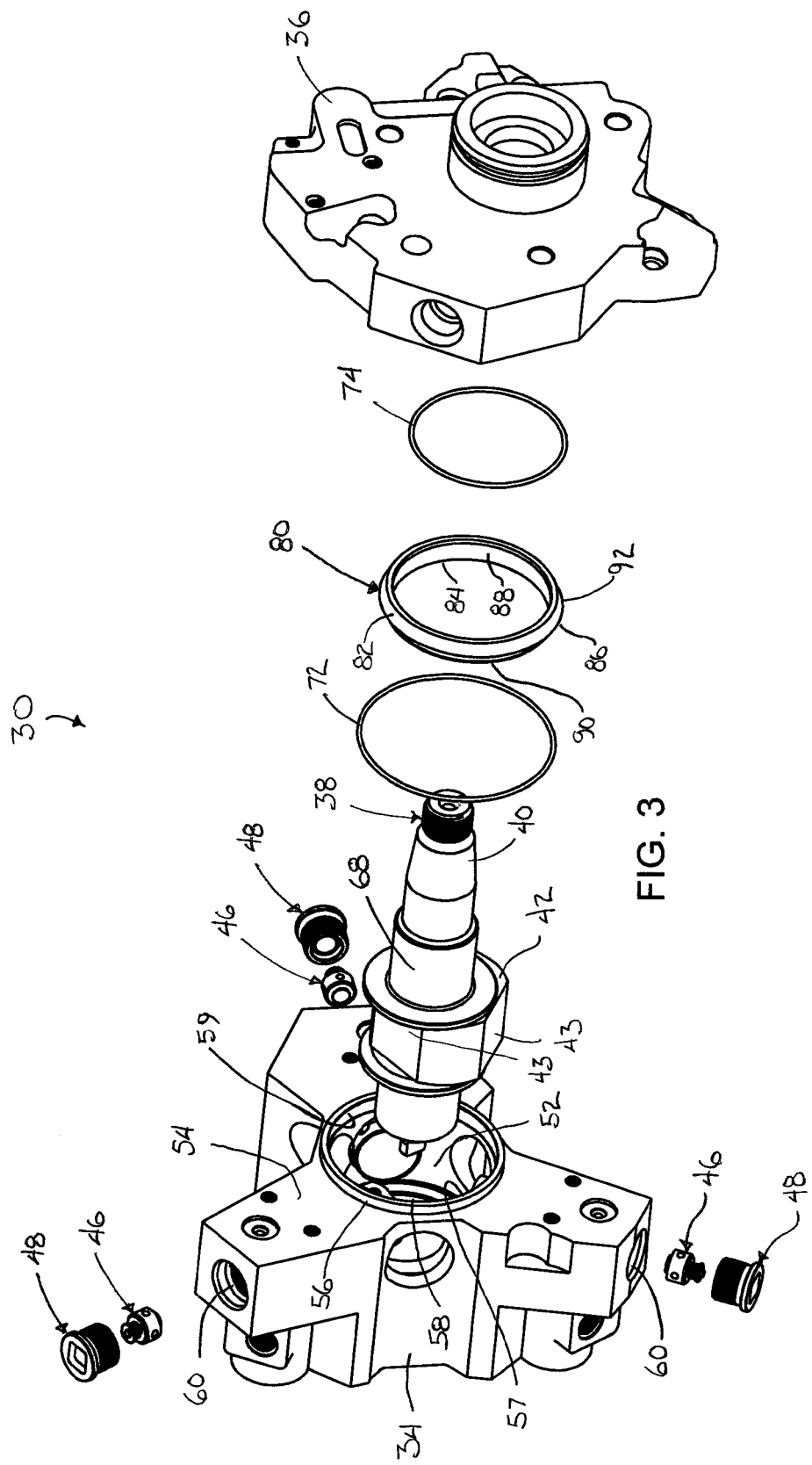
FIG. 3 is an exploded perspective view of the fuel pump assembly of FIG. 1.

The present invention will now be described with reference to the accompanying figures, wherein the numbered elements in the following written description correspond to like-numbered elements in the figures. A fuel pump or fuel pump assembly is shown at 30 in the various views, where fuel pump 30 comprises a common rail fuel pump for supplying high pressure fuel to a rail (not shown) to which are connected various injectors (not shown) for providing fuel to the cylinders of an engine. Fuel pump 30 includes a body assembly 32 comprising a body or first body portion 34 and a cover or second body portion 36, with body assembly 32 housing a cam assembly 38 that rotates within body assembly 32 for providing high pressure fuel to the rail. Cam assembly 38 includes a rotating cam 40 having an eccentric lobe 41 (FIG. 4) over which is disposed a polygon shaped lobe 42 having cam surfaces 43 that drive plungers 44 within bores 45 of body 34 (one shown in FIG. 4) to generate the high pressure fuel supply. Fuel is delivered into body 34 through three inlet valve assemblies 46 that are held within body 34 by inlet valve retainers 48. In the illustrated embodiment, fuel pump 30 comprises a modified Bosch CP3 common rail injection pump.

Body assembly 32 defines a cavity 50 within which cam assembly 38 is disposed, with body 34 including a cavity or bore 52 within which lobe 42 is located, where cavity 52 defines a portion of cavity 50. Body 34 further includes a mounting face or surface 54 and a circumferential upstanding ridge or flange 56 disposed about an opening 58 to cavity 50, where body 34 includes a radial surface or wall 59 at flange 56 that extends circumferentially about opening 58. Body 34 additionally includes threaded bores 60 for receiving retainers 48, as discussed in more detail below.

Figure 4:
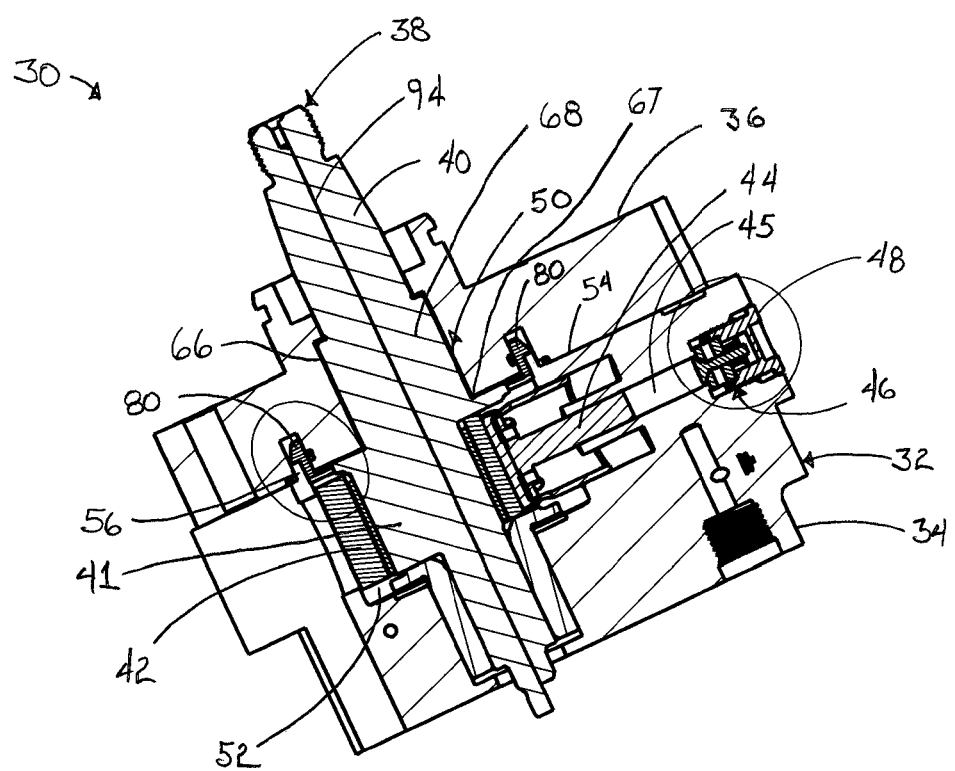
FIG. 4 is a cross sectional view of the fuel pump assembly of FIG. 1 taken along the line A-A of FIG. 2.
Figure 5A:
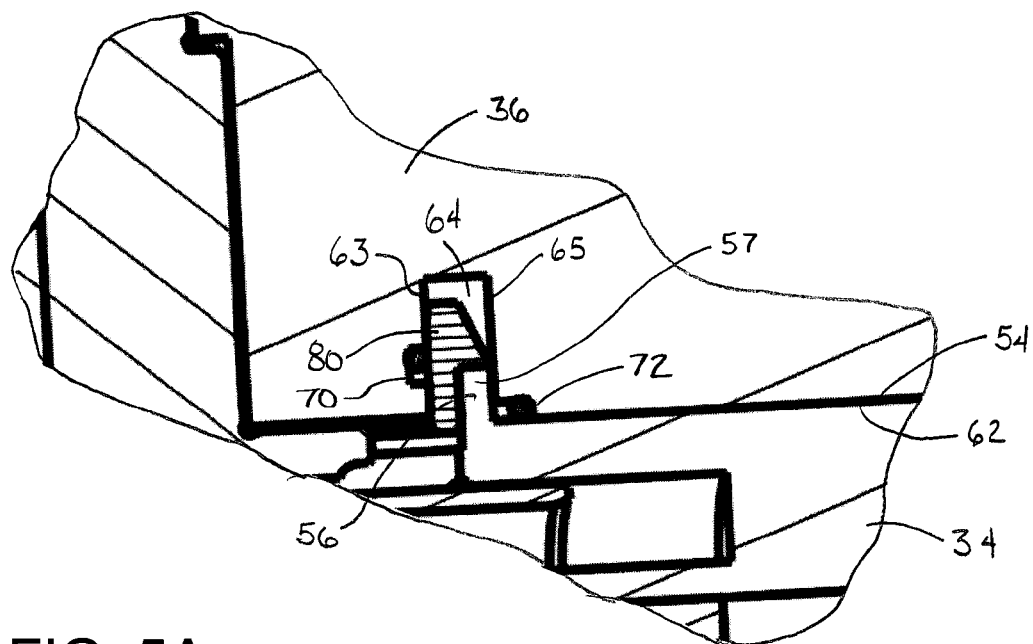
FIGS. 5A and 5B are partial close up views of portions of FIG. 4 showing a seal cap in accordance with an aspect of the present invention.
Figure 5B:
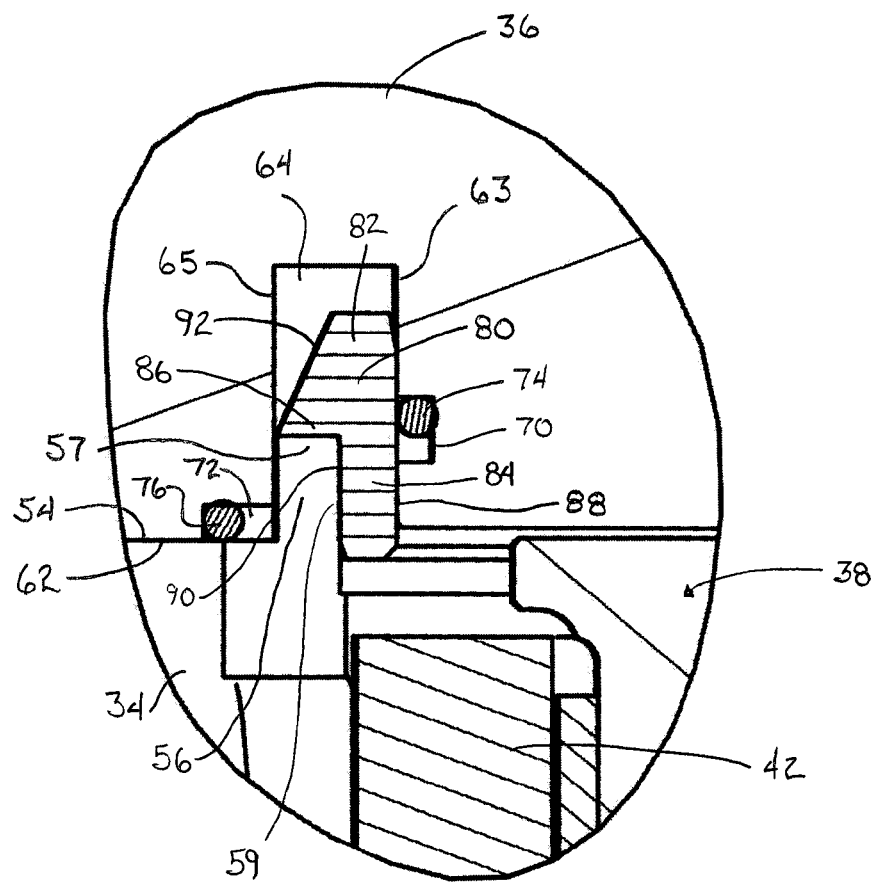

As understood from FIGS. 4, 5A and 5B, cover 36 includes a mounting face or surface 62 that mates with surface 54 of body 34 when assembled together. Cover 36 further includes a circumferential groove or channel 64 disposed on surface 62, where channel 64 extends into cover 36 perpendicularly relative to surface 62 and includes an inner wall 63 and an outer wall 65. Channel 64 is located about a cavity 66 that defines a portion of cavity 50 and defines an opening 67 in cover 36, where cavity 66 receives a section 68 of cam 40 for rotational support of the cam 40. Cover 36 further includes a pair of seal ring grooves 70, 72, for receiving seal rings 74, 76, respectively, where groove 70 is disposed radially inwardly relative to channel 64 and groove 72 is disposed radially outwardly relative to channel 64. When cover 36 and body 34 are assembled together, flange 56 is received within channel 64 along with a seal cap 80, as discussed in more detail below.

With reference now to FIGS. 3, 4, 5A and 5B, seal cap 80 is positioned between body 34 and cover 36 when assembled. Seal cap 80 comprises a circumferential ring member and includes a top or head portion 82 and a wall portion 84 extending axially relative to head portion 82, where head portion 82 extends radially outwardly relative to wall portion 84 to define a radially extending shoulder or lip 86. Seal cap 80 further defines an internal radial surface or wall 88 and an external radial surface or wall 90, with head portion 82 including an angled radial surface or wall 92 (see FIG. 5B). Seal cap 80 is a rigid member, and in the illustrated embodiment is a metallic member.

Seal cap 80 is assembled to flange 56 by placing shoulder 86 on a top end 57 of flange 56, whereby axial location is maintained by light interference between external radial wall 90 and opening 58. Shoulder 86 is also seated against top end 57 of flange 56 through a zero to positive pressure differential of cavity 52 over cavity 50 acting on the projected area between radial wall 59 and radial wall 88. As understood from FIGS. 5A and 5B, flange 56 and seal cap 80 thereby fit within channel 64, with flange 56 and wall portion 84 having a cross-sectional width sized to slip fit within channel 64. When so assembled, seal ring 74 within ring groove 70 presses against internal radial wall 88 of seal cap 80 to inhibit or seal against fuel leaking there past. Correspondingly, seal ring 76 located within groove 72 on cover 36 likewise inhibits or seals against fuel leaking past the joint between cover 36 and body 34 to a location exterior of body assembly 32.

As noted, cam 40 includes an eccentric lobe 41 such that when cam 40 is rotated polygon lobe 42 is driven in an eccentric manner whereby cam surfaces 43 will undergo radial movement relative to the rotational axis 94 of cam 40 to drive plungers 44. In the illustrated embodiment, lobe 42 of cam 40 is sized to provide greater pumping stroke to plungers 44 relative to a conventional pump, with lobe 42 being sized such that it cannot be installed in the opening of a conventional pump. Accordingly, opening 58 of body 34 is sized to enable installation of lobe 42 such that positions about polygon lobe 42 that are at the maximum radial distance from axis 94 are located axially beneath seal cap 80 when cap 80 is installed, whereby the polygon lobe 42 is able to drive the plungers 44 with a greater stroke. That is, as best understood from FIG. 5B, in order to install and/or remove cam assembly 38 into or from body 34, seal cap 80 must be removed, with opening 58 providing sufficient clearance for polygon lobe 42 to be installed into and/or removed from cavity 52. When seal cap 80 is installed on flange 56 with lobe 42 located within lobe cavity 52, the radial distance from axis 94 to the inner wall 88 of seal cap 80 is less than the radial distance from axis 94 to portions of the outer periphery of cam lobe 42.

In an alternative arrangement, rather than engage seal cap 80 with flange 56, body 34 can be machined such that flange 56 is removed whereby a larger opening is formed relative to opening 58. Still further, in this alternative embodiment a circumferential groove or channel or pocket is located on body 34 relative to surface 54. An alternative seal cap is correspondingly then provided that is located by or within the pocket formed in surface 54 of body 34. The alternative seal cap includes a portion extending upward relative to surface 54 for receipt in groove 64, including an axially extending wall defining or including an internal radial surface or wall against which seal ring 74 engages.

Figure 6A:
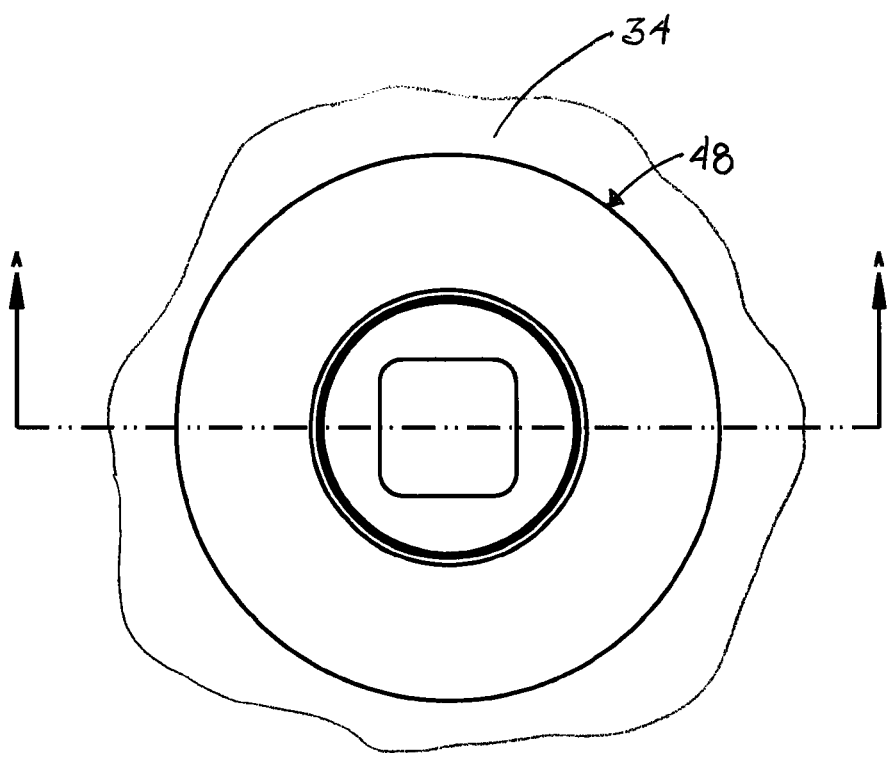
FIG. 6A is a top plan view of an inlet valve retainer of the fuel pump assembly of FIG. 1.
Figure 6B:
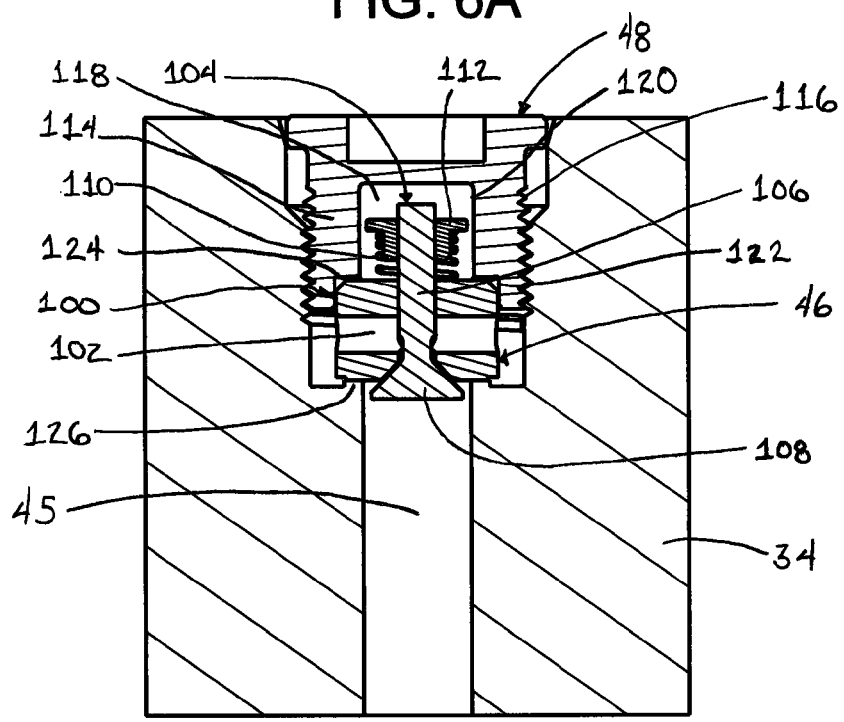
FIG. 6B is a partial cross sectional view of the fuel pump assembly of FIG. 1 taken through the inlet valve retainer along the line A-A of FIG. 6A.

Referring now to FIGS. 4, 6A and 6B, inlet valve assembly 46 is shown to include a valve body 100 having a fuel passage 102 there through, and includes a valve 104 having a valve stem 106 and a valve head 108, where valve head 108 selectively seals against valve body 100. Valve assembly 46 further includes a biasing member comprising a spring 110 and a seat 112 affixed to stem 106 such that spring 110 normally biases valve head 108 into the closed or sealed position relative to body 100 shown in FIG. 6A. Valve 104 is opened to allow fuel supplied to fuel passage 102 to fill bores 45 when plungers 44 draw back within bores 45 relative to valve assemblies 46.

Inlet valve retainer 48 comprises a retainer body 114 having external threads 116 and an internal cavity 118. Cavity 118 includes a first portion 120 and a second portion 122, with first and second portions 120, 122 being generally cylindrical in the illustrated embodiment and with first portion 120 having a smaller internal diameter relative to second portion 122 such that a shoulder 124 is formed there between. Still further, valve body 100 is sized to be received within second portion 122 such that shoulder 124 is able to contact body 100. Second portion 122 of cavity 118 thus defines a receptacle for receiving valve body 100. Moreover, as understood from FIG. 6A, threaded bores 60 of body 34 have a greater diameter than bores 45 to define a valve seat 126. Thus, when assembled together, valve retainer 48 axially locates or pilots valve assembly 46 relative to bore 45 by way of receiving valve assembly 46 within second portion 122 of cavity 118 and contacting valve assembly 46 at shoulder 124 between valve seat 126 of body 34.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A fuel pump, said fuel pump comprising:
a cam assembly, said cam assembly having a longitudinal axis and including a lobe and a cam, with said lobe including cam surfaces for driving plungers;
a body assembly including a cavity for receiving said cam assembly, said body assembly including a body portion and a cover portion with said body portion and said cover portion cooperatively forming said cavity, said body portion including a lobe cavity, an engagement surface and an opening at said lobe cavity, and said cover portion including an engagement surface and an opening in said engagement surface of said cover portion at said cavity, and wherein a groove is formed in one of said engagement surfaces of said body portion or said cover portion;
a seal cap, said seal cap being separate from said body portion and said cover portion; and
said engagement surfaces being mated together with said cam assembly disposed in said cavity and extending through said openings and with said cam configured to rotate about said longitudinal axis in said cavity with said lobe disposed in said lobe cavity of said body portion;
wherein said seal cap is at least partially disposed in said groove adjacent said lobe cavity and wherein said groove is formed in said engagement surface of said cover portion, and wherein said body portion further includes a flange disposed about said opening of said body portion, and wherein said seal cap is disposed on said flange with said flange and said seal cap being at least partially disposed in said groove when said body portion and said cover portion are assembled together, and wherein said seal cap includes an internal wall and an external wall, and includes a radially outwardly projecting shoulder extending from said external wall relative to said longitudinal axis, and wherein said shoulder is disposed on an end of said flange when said seal cap engages with said flange; and
wherein when said cam rotates during operation of the fuel pump a radial distance from said longitudinal axis to said internal wall of said seal cap is less than a radial distance to portions of said lobe that are at a maximum radial distance from the longitudinal axis of said cam assembly.

2. The fuel pump of claim 1, wherein said seal cap includes a wall portion extending axially relative to said shoulder with said wall portion being inwardly angled relative to said internal wall.

3. The fuel pump of claim 1, wherein said groove includes an inner wall and an outer wall with said inner wall including a seal ring groove, and wherein a seal ring disposed within said seal ring groove contacts said seal cap.

4. The fuel pump of claim 1, further including an inlet valve assembly and an inlet valve retainer, and wherein said body portion includes a threaded bore and said inlet valve retainer includes external threads for engagement with said threaded bore for retaining said inlet valve assembly, said inlet valve retainer further including an internal cavity defining a receptacle, and wherein said inlet valve assembly includes a valve body with said valve body being received within said receptacle for axially aligning said inlet valve assembly relative to said threaded bore.

5. The fuel pump of claim 4, further including a plurality of said inlet valve assemblies and a plurality of said inlet valve retainers, and wherein said body portion includes a plurality of said threaded bores with each said threaded bore receiving one of said inlet valve assemblies and one of said inlet valve retainers.

6. The fuel pump of claim 1, wherein said body portion includes a plurality of plungers driven by said lobe for generating a high pressure fuel supply.

7. A fuel pump, said fuel pump comprising:
a cam assembly, said cam assembly having a longitudinal axis and including a lobe and a cam, with said lobe including cam surfaces for driving plungers;
a body assembly including a cavity for receiving said cam assembly, said body assembly including a body portion and a cover portion with said body portion and said cover portion cooperatively forming said cavity, said body portion including a lobe cavity, an engagement surface, an opening at said lobe cavity, and a flange disposed about said opening of said body portion with said flange projecting outwardly from said engagement surface of said body portion, and said cover portion including an engagement surface and an opening in said engagement surface of said cover portion at said cavity, and wherein a channel is formed in said engagement surface of said cover portion;
a seal cap, said seal cap being separate from said body portion and said cover portion, wherein said seal cap includes an internal wall and an external wall, and includes a radially outwardly projecting shoulder extending from said external wall relative to said longitudinal axis, and wherein said shoulder is disposed on an end of said flange when said seal cap engages with said flange;
said engagement surfaces being mated together with said cam assembly disposed in said cavity and extending through said openings and with said cam configured to rotate about a longitudinal axis of said cam assembly perpendicular to said engagement surfaces with said lobe disposed in said lobe cavity of said body portion, and wherein at least a portion of said channel is aligned with said opening of said body portion with said seal cap being disposed at said flange with said flange and said seal cap being at least partially disposed in said channel such that said seal cap is aligned with said opening of said body portion, and wherein when said cam rotates during operation of the fuel pump a radial distance from said longitudinal axis to said internal wall of said seal cap is less than a radial distance to portions of said lobe that are at a maximum radial distance from the longitudinal axis of said cam assembly.

8. The fuel pump of claim 7, wherein said seal cap includes a wall portion extending axially relative to said shoulder with said wall portion being inwardly angled relative to said internal wall.

9. The fuel pump of claim 7, wherein said channel includes an inner wall and an outer wall with said inner wall including a seal ring groove, and wherein a seal ring disposed within said seal ring groove contacts said seal cap.

10. The fuel pump of claim 7, further including an inlet valve assembly and an inlet valve retainer, and wherein said body portion includes a threaded bore and said inlet valve retainer includes external threads for engagement with said threaded bore for retaining said inlet valve assembly, said inlet valve retainer further including an internal cavity defining a receptacle, and wherein said inlet valve assembly includes a valve body with said valve body being received within said receptacle for axially aligning said inlet valve assembly relative to said threaded bore.

11. The fuel pump of claim 10, further including a plurality of said inlet valve assemblies and a plurality of said inlet valve retainers, and wherein said body portion includes a plurality of said threaded bores with each said threaded bore receiving one of said inlet valve assemblies and one of said inlet valve retainers.

12. The fuel pump of claim 7, wherein said seal cap comprises a ring member.

13. A fuel pump, said fuel pump comprising:
a body portion, said body portion including a threaded bore, an inlet valve assembly for enabling fuel to be delivered into the fuel pump, and an inlet valve retainer;
wherein said inlet valve retainer includes external threads for engagement with said threaded bore for retaining said inlet valve assembly, said inlet valve retainer further including an internal cavity defining a receptacle, and wherein said inlet valve assembly includes a valve and a valve body, with said valve body including a valve bore and a fuel passage and with said valve disposed in said valve bore of said valve body and configured for regulating fuel flow through said fuel passage, and with said valve body being partially received within said receptacle whereby said valve body is partially recessed into said internal cavity of said valve retainer for axially aligning said inlet valve assembly relative to said threaded bore, and wherein a portion of said valve body extends out of said internal cavity such that said portion of said valve body is not located within said internal cavity, and wherein at least a portion of said fuel passage is disposed in said portion of said valve body that extends out of said internal cavity.

14. The fuel pump of claim 13, further including:
a cam assembly, said cam assembly including a lobe;
a cover portion, with said body portion and said cover portion being assembled together and cooperatively defining a cavity for receiving said cam assembly, said body portion including a lobe cavity, an engagement surface and an opening at said cavity and said cover portion including an engagement surface and an opening in said engagement surface of said cover portion at said cavity, and wherein a groove is formed in one of said engagement surfaces of said body portion or said cover portion;
a seal cap, said seal cap being separate from said body portion and said cover portion;
said engagement surfaces being mated together with said cam assembly disposed in said cavity and extending through said openings and configured to rotate in said cavity with said lobe disposed in said lobe cavity of said body portion;
and wherein said seal cap is at least partially disposed in said groove adjacent said lobe cavity.

15. The fuel pump of claim 14, wherein said groove is formed in said engagement surface of said cover portion.

16. The fuel pump of claim 15, wherein said body portion further includes a flange disposed about said opening of said body portion, and wherein said seal cap is disposed on said flange with said flange and said seal cap being at least partially disposed in said groove when said body portion and said cover portion are assembled together.

17. The fuel pump of claim 13, further comprising a valve spring configured to apply a biasing force to said valve, and wherein said valve spring is disposed within said internal cavity of said valve retainer.

18. The fuel pump of claim 13, wherein said valve includes a valve stem, and wherein said fuel passage extends laterally within said valve body relative to said valve stem.

* * * * *